United States Patent Office 3,541,297
Patented Nov. 17, 1970

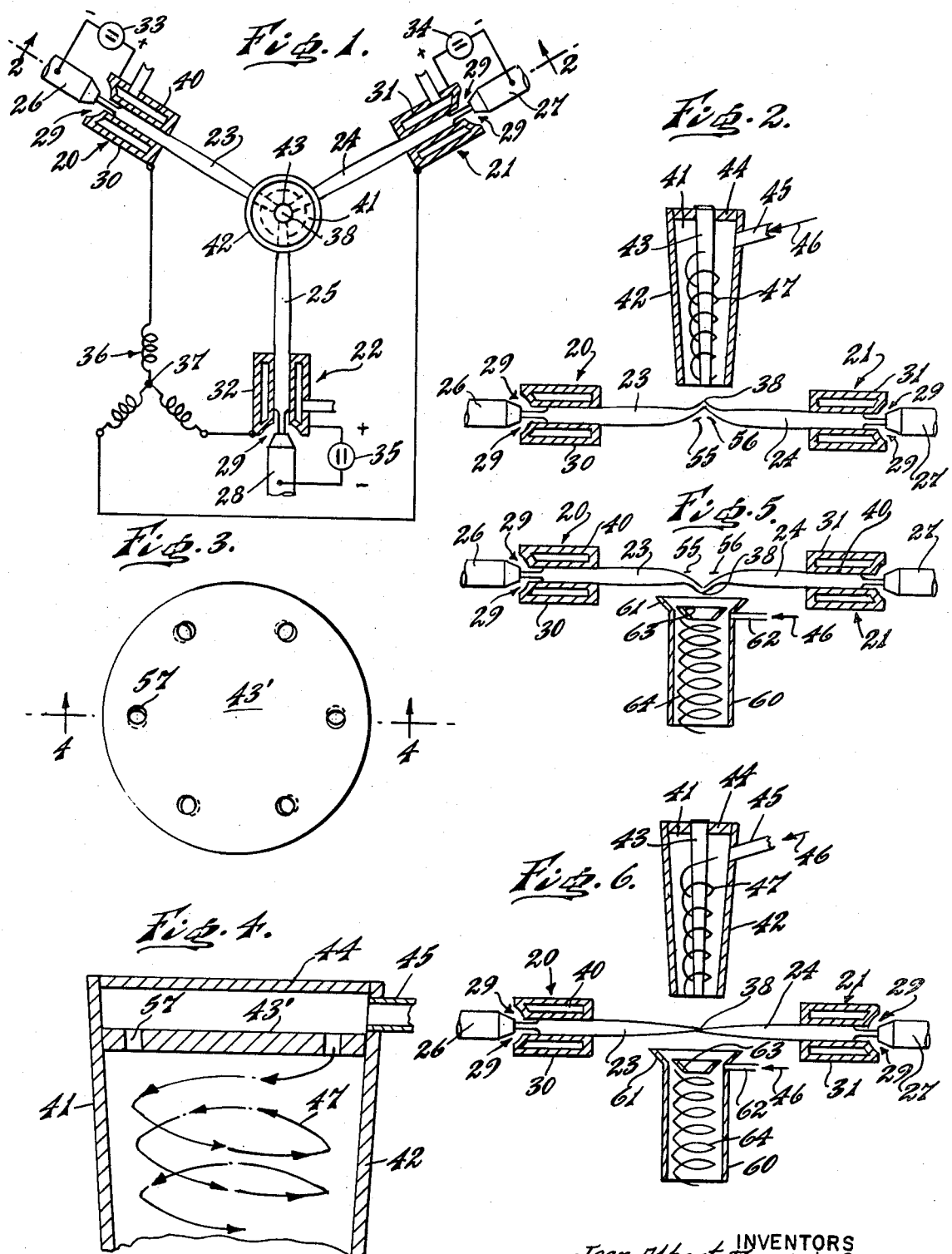

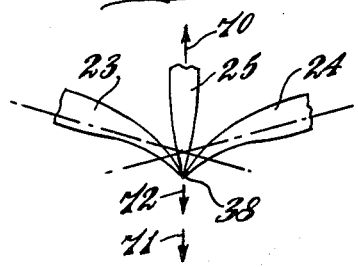
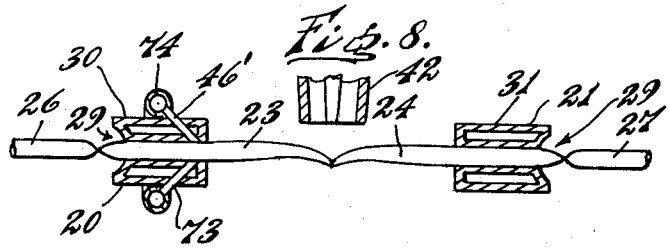
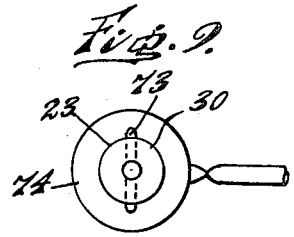
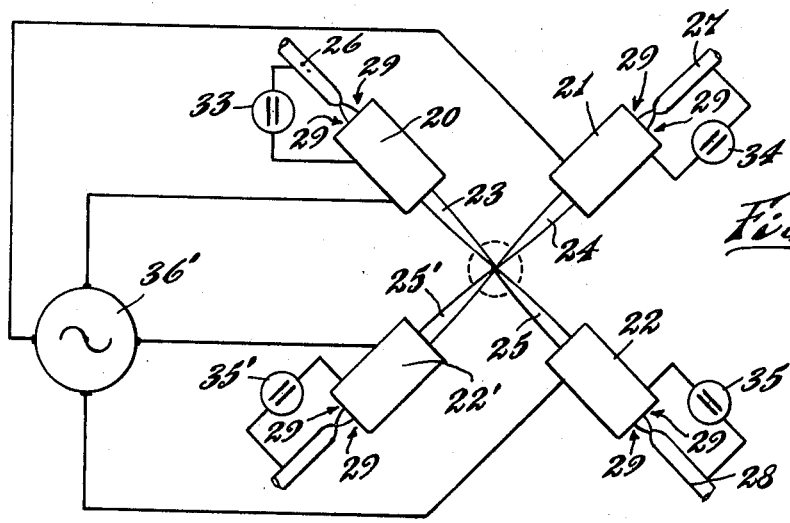

3,541,297
HEATING A REACTIVE FLUID TO HIGH TEMPERATURE
Jean Albert François Sunnen, Waterloo, and Henry René Paul Jules Schoumaker, Jette, Belgium, assignors to La Soudure Electrique Autogene Procedes Arcos, Brussels, Belgium, a corporation of Belgium
Filed Dec. 31, 1968, Ser. No. 788,209
Claims priority, application Belgium, Oct. 7, 1968, 64,373
Int. Cl. B23k 9/00
U.S. Cl. 219—121
16 Claims

ABSTRACT OF THE DISCLOSURE

A process or apparatus for heating a reactive fluid by at least two plasma torches having converging jets in which the reactive fluid is carried to the vicinity of the zone of convergence of the plasma jets in a helical motion whose axis is equally inclined with respect to each of the plasma jets.

---

The present invention relates to a process and apparatus for heating at least one reactive fluid to high temture, using at least two plasma torches each of which has a solid electrode and a hollow electrode, and each of the hollow electrodes being connected to a distinct terminal of an alternating current source. A direct current arc is maintained between the solid electrode and the hollow electrode of each of the torches, and a gas such as an inert gas is injected into each torch at the inlet of the hollow electrode. The torches are positioned so that the plasma jets resulting from the gas injection converge. A reactive fluid is fed in the vicinity of the zone of convergence of the plasma jets.

In the present patent application, the words "reactive fluid" means a reactive material which can be a gas, a liquid, or a solid in powder form. The reactive fluid is capable of participating in some reaction which forms no part of the present invention.

Processes of the general character under discussion have been described in Jean François Albert Sunnen U.S. U.S. patent application Ser. No. 742,051, filed July 2, 1968, for Method and Installation for Forming a Plasma Jet at High Temperature.

In such prior art processes, a gas which is generally inert, such as argon or nitrogen, is injected in each of the plasma torches, and to avoid premature wear on the electrodes, the reactive fluid is fed outside of the regions where the alternating current and the direct current arcs impinge upon the hollow electrode.

The device is adjusted to bring the reactive fluid into the zone of convergence of the plasma jets in a direction of equal inclination with respect to each of the plasma jets. However, when trying to feed a very large amount of reactive fluid into the plasma, it has been found that the alternating current discharge emitted from the hollow electrodes becomes unstable. Such instability results from cooling the plasma by the reactive fluid introduced in large amounts. This difficulty can, however, be remedied by improving the ionization in the space heated by the alternating current, by increasing the power of the direct current arc of each of the torches. Such a solution is not the most advantageous one, because it requires a more expensive source of direct current and higher losses in energy occur.

In addition, since, in these prior art processes, the reactive fluid is fed across and into the plasma, these processes do not permit heating small amounts of reactive fluid to a moderate temperature.

The present invention has not only succeeded in remedying these difficulties, but also has obtained additional advantages which are described below.

In the process of the invention, the reactive fluid is fed in the vicinity of the zone of convergence of the plasma jets, in a substantially helical direction with the axis of the helix forming a substantially equal angle with respect to each of the plasma jets.

In a case in which a large amount of reactive fluid must be heated to a high temperature, the helical motion of the reactive fluid is adjustably oriented toward the zone of convergence of the plasma jets, so that the reactive fluid enters this zone while being rotated in its helical path. In this case it has been found that the helical swirling motion given to the reactive fluid when penetrating into the plasma produces a thorough mixing between the reactive fluid and the plasma. Furthermore, the swirling motion of the reactive fluid creates a suction toward the incoming fluid in the neutral junction of the alternating current discharge.

On the contrary, when the reactive fluid must be heated only moderately the helical motion of the reactive fluid is oriented to move it away from the zone of convergence of the plasma jets. In this form of the invention, the fluid is essentially subjected to radiation from the plasma.

Where large amounts of reactive fluid must be heated or if it is desired to mix two reactive fluids at high temperature, both embodiments of the process can be combined. For instance, the helical motion of one of the reactive fluids is oriented to move it away from the convergence of the plasma jets, while the helical motion of the other reactive fluid is oriented to move it toward the zone of convergence, so that the latter fluid first penetrates the zone of convergence and later penetrates into the first mentioned reactive fluid.

In a preferred embodiment of the invention where at least three plasma torches are used, the helical swirling motion given to the reactive fluid rotates it in the same direction as the rotary field of the three-phase current which is flowing between the three torches.

The invention also contemplates equipment to practice the processes of the invention comprising at least two plasma torches, each having one solid electrode and one hollow electrode, both of these electrodes being connected to a source of direct current for each torch, means capable of feeding a gas such as an inert gas or a mixture of inert gases through each of the hollow electrodes, the hollow electrodes being each connected to a distinct terminal of a source of alternating current and being oriented so that the plasma jets emerging from each of the plasma torches are convergent, and means to feed the reactive fluid in the vicinity of the zone of the convergence of the plasma jets.

In the invention this apparatus comprises at least one means to move the reactive fluid in a substantially helical path in the vicinity of the zone of convergence of the plasma jets, the axis of the helix being with respect to each of the plasma jets at a substantially equal angle. The means for moving the reactive fluid in a helical path may consist, for example, of a substantially truncated conical or cylindrical tube with an inlet for the fluid into such tube which is directed in a tangential direction.

The figures show, only by way of example, several embodiments of the invention and will aid to the understanding of the invention and aid in appreciating the advantages which have been mentioned.

FIG. 1 is a horizontal cross section of a preferred embodiment of the invention, the plasma jets which may be directed in a diagonal or conical direction to the point of convergence being for the purpose of illustration shown in the plane of the drawing.

FIG. 2 is a schematic cross section on the line 2—2 of FIG. 1, showing the plasma jets converging as shown in FIG. 1 instead of being directed diagonally toward a point of convergence.

FIG. 3 is an enlarged plan view of a disc for causing a helical swirl.

FIG. 4 is a section of an inlet device incorporating the disc of FIG. 3, the section being taken on the line 4—4 of FIG. 3.

FIG. 5 is a schematic view corresponding to FIG. 2, but showing a modified embodiment of the invention with provision to create a helically moving reactive fluid stream directed away from the point of convergence of the plasma jets.

FIG. 6 is a schematic partial cross section similar to FIGS. 2 and 5, showing a further embodiment of the invention which combines features of the form of FIGS. 1 and 2 and also of the form of FIG. 5.

FIG. 7 is an enlarged portion of a part of FIG. 6.

FIG. 8 is a view similar to FIG. 2 showing a modification of the device of the invention which directs a reactive fluid sidewise into at least one of the plasma jets.

FIG. 9 is a front elevation of one of the jets in FIG. 8.

FIG. 10 is a view similar to FIG. 1 showing a circuit diagram for two-phase operation.

In the device of FIGS. 1 and 2 there are three plasma torches 20, 21 and 22, set at 120° to one another in plan view, and oriented along the generatrices of an inverted cone having its apex directed downward and located at the zone of convergence of plasma jets 23, 24 and 25 which respectively emerge from these three torches. For the sake of simplicity, the torches are shown as if they all lie in one plane. Each of said torches comprises a solid electrode 26, 27 or 28, and a hollow electrode 30, 31 or 32. Said torches 20, 21 and 22 are fed respectively from sources of direct current 33, 34 and 35 to sustain a direct current arc between the solid electrode and the hollow electrode of each torch. A gas such as an inert gas, for example argon or nitrogen, is projected as suggested by arrows 29 through the interior of the hollow electrode from a suitable gas conduit at the back of the hollow electrode so as to create the plasma 23, 24 or 25.

The hollow electrodes 30, 31 and 32 are each connected to one distinct phase of a source of three-phase alternating current 36 whose neutral point 37 is kept at the same potential as the center junction of the zone of convergence 38 of the plasma jets 23, 24 and 25. This point is therefore the neutral point of the alternating electrical discharge. The alternating power source 36 is intended on the one hand to increase the energy of the plasma jets 23, 24 and 25 emitted by the torches 20, 21 and 22 and, on the other hand, to produce a rotating magnetic field exerting an influence upon the zone of convergence of the plasma jets, analogous to the rotating field in a polyphase induction motor.

The ratio between the power developed by the source of alternating current 36 and the total power developed by the sources of direct current 33, 34 and 35 is advantageously greater than three to one.

The equipment may include means capable of impressing on the rotating field created by the source of alternating current 36, an auxiliary magnetic rotating field from any suitable mechanism as well known in the art, such as the field coils of a polyphase induction motor.

The hollow electrodes 30, 31 and 32 have cavities 40 to circulate a cooling fluid.

The apparatus shown in FIGS. 1 and 2 includes also a vertical tube 41 of suitable shape, set over the zone of convergence 38 of the plasma jets 23, 24 and 25. The tube 41 consists of a truncated conical side wall 42 surrounding an internal truncated conical core 43 which is at the axis and held in a closed top wall 44. Both the tube and the core are of diminishing diameter toward the bottom in the preferred form. At the top the tube 41 is provided with an inclined inlet tube 45 which is directed tangentially to the circular cross section so as to inject reactive fluid shown by arrow 46 to rotate in a helical path shown schematically by the helix 47 as the reactive fluid moves down toward the zone of convergence of the plasma jets. Thus the reactive fluid crosses the zone of convergence 38 moving helically. The reactive fluid is ionized by contact with the plasma in the zone of convergence and is then directed toward any point where a reaction is to take place, for example a reaction pool in a furnace (not shown) which is heated by the plasma torches 20, 21 and 22.

By action of the helical swirling motion of the reactive fluid, the neutral point of electric discharge is sucked upward as shown in FIG. 2 because of the vacuum created in the axis of the fluid helix by centrifugal forces. Dotted lines 55, 56 show the position of the tips of the flames of the plasma torches and of their point of convergence in the case where the reactive fluid is fed vertically downward into the zone of convergence 38.

In an alternate embodiment of the apparatus of the invention, as shown in FIGS. 3 and 4, the internal truncated conical core 43 is replaced by a disc 43' pierced with diagonally downwardly directed conduit holes 57 communicating with the truncated conical tube 42 and connected to inlet tube 45. Said conduit holes 57 are shaped to provide a helical swirling motion for the reactive fluid inside the wall of the tube 42.

The embodiment of the invention shown in FIG. 5 is intended for moderate heating of small amounts of reactive fluid. This apparatus includes a cylindrical vertical tube 60 whose axis extends through the center of the zone of convergence 38 of the plasma jets 23, 24 and 25, the tube 60 being located slightly below this zone of convergence. At the top the tube 60 desirably has a downwardly converging inlet portion 61. An inlet tube 62 is directed into the interior of the tube 60 suitably in a tangential direction to introduce reactive fluid 46. Downwardly converging circular vanes 63 are secured as by suitable spiders to the interior wall of the tube 60 opposite the inlet 62 so as to aid in giving to the fluid emerging from the inlet tube 62 a helical motion which will move the reactive fluid away from the zone of convergence 38 of the plasma jets. The helical motion of the reactive fluid is shown schematically by helix 64.

The swirling motion of the reactive fluid 46 creates a suction toward the inlet end of such fluid near the top of tube 60 so as to draw the neutral point 38 of the plasma jets downward as shown in FIG. 5.

In a device as shown in FIG. 6, particularly for heating large amounts of reactive fluid to relatively low temperatures, for instance 1500 to 2000° C., the fluid is preferably fed into the apparatus in two steps. With a low or medium output, a first fraction of the reactive fluid 46 is introduced upstream of the zone of convergence 38 and by helical motion as shown in FIGS. 1 and 2. This arrangement is important as it avoids blowing out the three-phase alternating arc. The reactive fluid is thus heated to about 4000 or 5000° C., maintaining favorable thermal conditions in the space occupied by the three-phase alternating current arc, and thereby assuring a stable alternating current discharge. In a second step, which is carried out simultaneously with the first step, a second fraction of reactive fluid 46 is introduced downstream from the zone of convergence 38 by a helical motion carrying the fluid away from the zone 38 in the manner shown schematically in FIG. 6.

This second reactive fluid then dilutes the first reactive fluid which was introduced upstream, so that the medium temperature which is desired is obtained by uniform radial distribution of the first and second portions of the reactive fluid.

FIG. 6 shows apparatus particularly designed to achieve this result. This consists of a combination of the features shown in FIGS. 1 and 2 and the features shown in FIG. 5. A tube 41 similar to that shown in FIGS. 1 and 2 introduces a first fraction of reactive fluid which is given a helical motion and projected across the zone of convergence 38 of the plasma jets 23, 24 and 25. A tube 60 similar to that shown in FIG. 5 introduces the remaining fraction of the reactive fluid and gives it a helical motion away from the zone of convergence 38 of the plasma jets 23, 24 and 25.

Both tubes 41 and 60 are coaxial, one above the zone of convergence 38 so that fluid emerges from this tube 41 and crosses the zone of convergence 38 and enters tube 60 and mixes there with the second fraction which is less highly heated.

An additional advantage of this double injection system is found in the possibility of stabilizing the location of the neutral point 38 of the three-phase alternating electric discharge by regulating the relative pressures in the reactive fluid applied upstream with respect to the reactive fluid introduced downstream along the common vertical axis of the tubes 41 and 60.

The displacement of this neutral point can be regulated by regulating the relative inputs of the fluid in the tube 41 on the one hand, and in the tube 60 on the other hand, to modify the pressure and suction effects exerted on the neutral point of the alternating electric discharges by the swirling columns of fluid from the tubes 41 and 60.

FIG. 7 shows schematically three competing forces which determine the position of the neutral point; namely, pressure forces 70 and 71 in tubes 41 and 60, and the force 72 caused by the rotating field created by the alternating current source of three-phase current and tending to spread the plasma jets 23, 24 and 25 apart from one another.

By the combined action of adjusting the two competing forces caused by the feeding of the fractions of the fluid, respectively upstream and downstream of the neutral point of the electrical discharges, it is possible to compensate for the effect of magnetic blow and to stabilize the neutral point.

It will be evident that the apparatus will be surrounded by a wall or crucible to form a furnace, for thermal treatment of a reactive fluid, but this surrounding wall, well known in the art, has been omitted for the sake of convenience in illustration. In the case where a particular reactive fluid is used, for instance oxygen, it will be advantageous to employ an apparatus as shown in FIG. 6 and described above. With an apparatus of this type, there are fewer problems in protecting the refractory or other walls of the space in which the arc is contained, against elevated temperatures, because oxygen is injected in tube 60 at relatively low temperature, thereby exerting a less pronounced temperature effect upon the walls of the tube 60.

The use of a single-step swirling injection, or alternately of two-step swirling injections, is also advantageous from the standpoint of the power supply of direct current for the three plasma torches. Since the ionizing conditions between the three torches are more favorable, it is possible without extinguishing the alternating arc, to reduce the power delivered in the direct current within a few seconds after the three-phase alternating electric arc has been struck. In other words, during the short period of striking the alternating current electric arc, a relatively high power is applied by the sources of direct current, for example, 20 to 30% of the superimposed alternating power. But as soon as this superimposed alternating current power has heated the reactive fluid in the container or refractory lining surrounding the torches, the direct current power can be reduced to a level needed to sustain the alternating plasma without risk of blowing out this plasma by the reactive fluid fed in the vicinity of the zone of convergence (in one step or in two steps) by the helical motion.

It will be evident that when reactive fluid is introduced in two steps, the fluids introduced in the two steps may be different if it is desired to effect a reaction between them. Likewise, the reactive fluid introduced in any one of the steps may be a mixture of reactive fluids if safety permits.

In a preferred form of the invention, in addition to the intense mixing from the swirling motion of the reactive fluid and the rotation of the alternating field developed by the current passed from each electrode to the next, an auxiliary magnetic field can also be used to create a rotation of the entire mass of ionized fluid in the manner of a polyphase induction motor.

In a particular embodiment of the invention, the neutral point of the alternating current discharges can be stabilized by acting simultaneously upon the angle between the three flame tips 23, 24 and 25, and the relation to the feed of the swirling fluid (the position of tubes 41 and 60). It will be understood that the position of this neutral point is determined by the action of two competing forces, the pressure or suction caused by the arrival of the swirling fluid and the magnetic alternating arc blow, this blow being greater as the angles between the three flame tips 23, 24 and 25 become sharper.

In an embodiment of the invention shown in FIGS. 8 and 9, an additional reactive fluid 46' is injected sidewise into at least one of the plasma jets, across the face of the hollow electrode from which this plasma jet emerges, downstream of the zone of impact of the electric arc in this electrode. This preferably enters through ports 73 from an annular conduit 74.

As was made clear in the definition of the invention as above set forth, the process can be applied to two torches fed from a monophase alternating current or to four torches fed from a two-phase alternating current, as well as for three or more torches for three-phase or polyphase current where the number of phases equals the number of torches. FIG. 10 illustrates a two-phase device having torches 20, 21, 22 and 22' connected to a two-phase alternating source 36'. The direct current sources are 33, 34, 35 and 35' and the plasmas produced are 23, 24, 25 and 25'.

The present invention is not limited to the embodiments shown. It will be evident that changes can be made in the form, arrangement and selection of materials for parts needed to produce the apparatus, provided that such changes do not contradict the subject matter covered by the following claims.

Having thus described our invention what we claim as new and desire to secure by Letters Patent is:

1. Apparatus for heating at least one reactive fluid to high temperature, comprising at least two plasma torches each provided with one solid electrode, one hollow electrode, and connections between a source of direct current, on the one hand, and the solid electrode and the hollow electrode, respectively, on the other hand, means for feeding gas through each of the hollow electrodes, said hollow electrodes being oriented to cause convergence of plasma jets emitted by each of the plasma torches, means for connecting each of said hollow electrodes to a different terminal of a source of alternating current, and means for feeding the reactive fluid to a point in the vicinity of the zone of convergence of the plasma jets, characterized by means for moving the reactive fluid helically in the vicinity of the zone of convergence of the plasma jets around an axis at a substantially equal angle with respect to each of the plasma jets.

2. Apparatus of claim 1, in which the means for moving the reactive fluid helically comprises a truncated tube of circular cross section and a tangential conduit for injecting said fluid into said tube.

3. Apparatus of claim 2, in which the tube is conical, converging toward the zone of convergence.

4. Apparatus of claim 2, in which the tube has vanes adjoining the injection conduit which impart helical motion to said fluid.

5. Apparatus of claim 2, in which the means for moving the reactive fluid helically comprises a core extending along the axis of the tube, said core having a circular cross section.

6. Apparatus of claim 2, in which the conduit in combination with the wall of the tube makes the reactive fluid move helically across the zone of convergence of the plasma jets.

7. Apparatus of claim 1, in which the means to move the reactive fluid helically produces a helical motion away from the zone of convergence of the plasma jets.

8. Apparatus of claim 1, in combination with a second means for moving a reactive fluid helically in the vicinity of the zone of convergence of the plasma jets around an axis by a substantially equal angle with respect to each of the plasma jets, the first-mentioned means moving the reactive fluid through the plasma jets and the second means moving the reactive fluid away from the plasma jets.

9. A process for heating at least one reactive fluid to high temperature, using at least two plasma torches, each of which includes one solid electrode and one hollow electrode, comprising passing a direct current between the solid electrode and the hollow electrode of each torch to form an arc, injecting gas in said electric arc at the inlets of the hollow electrodes to project plasma jets from the hollow electrodes, said torches being oriented to make the plasma jets converge, passing an alternating current through the plasma jets among the hollow electrodes and feeding reactive fluid in the vicinity of the zone of convergence of said plasma jets, characterized in moving the reactive fluid helically in the vicinity of the zone of convergence of the plasma jets, with the axis of the helix with respect to each of said plasma jets at an equal angle.

10. A process of claim 9, which comprises moving the reactive fluid in its helical path toward the zone of convergence of the plasma jets so that the reactive fluid will cross said zone while moving helically.

11. A process of claim 9, which comprises moving the reactive fluid in its helical path away from the zone of convergence of the plasma jets.

12. A process of claim 9, in which the alternating current is polyphase.

13. A process of claim 12, in which at least three plasma torches are used, which comprises moving the reactive fluid in its helical path in the direction of rotation of the field caused by the alternating current.

14. A process of claim 9, which heats two reactive fluids, which comprises moving one of said fluids in a helical path away from the zone of convergence of the plasma jets and moving the other of said fluids in a helical path toward said zone of convergence, so that the latter fluid crosses the zone of convergence and penetrates the former fluid.

15. A process of claim 14, which comprises adjusting the relative feeds of the two reactive fluids to adjust the neutral point of the alternating current discharge in the plasma, making due allowance for the rotating field caused by the source of alternating current.

16. A process of claim 9, which comprises injecting an additional reactive fluid laterally into at least one of the plasma jets across the hollow electrode through which said plasma jet is emitted and downstream with respect to the impact zone of the electric arc in said hollow electrode.

References Cited

UNITED STATES PATENTS

| | | | |
|---|---|---|---|
| 3,205,338 | 9/1965 | Sunnen | 219—121 |
| 3,222,568 | 12/1965 | Richards | 219—121 X |
| 3,373,306 | 3/1968 | Karlovitz | 219—121 X |

JOSEPH V. TRUHE, Primary Examiner

C. L. ALBRITTON, Assistant Examiner

U.S. Cl. X.R.

219—75